United States Patent
Yonezawa et al.

(10) Patent No.: US 12,555,259 B2
(45) Date of Patent: Feb. 17, 2026

(54) PRODUCT IDENTIFICATION APPARATUS, PRODUCT IDENTIFICATION METHOD, AND NON-TRANSITORY COMPUTER-READABLE MEDIUM

(71) Applicant: NEC Corporation, Tokyo (JP)

(72) Inventors: Yaeko Yonezawa, Tokyo (JP); Katsumi Kikuchi, Tokyo (JP); Soma Shiraishi, Tokyo (JP); Yu Nabeto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 408 days.

(21) Appl. No.: 17/923,319

(22) PCT Filed: May 14, 2020

(86) PCT No.: PCT/JP2020/019258
§ 371 (c)(1),
(2) Date: Nov. 4, 2022

(87) PCT Pub. No.: WO2021/229753
PCT Pub. Date: Nov. 18, 2021

(65) Prior Publication Data
US 2023/0237687 A1    Jul. 27, 2023

(51) Int. Cl.
*G06T 7/70* (2017.01)
*G06Q 20/20* (2012.01)
(Continued)

(52) U.S. Cl.
CPC ............. *G06T 7/70* (2017.01); *G06Q 20/203* (2013.01); *G06Q 30/0639* (2013.01);
(Continued)

(58) Field of Classification Search
CPC . G06T 7/70; G06T 7/11; G06T 3/4038; G06T 2207/20212; G06T 2207/30242;
(Continued)

(56) References Cited

U.S. PATENT DOCUMENTS

2016/0171707 A1* 6/2016 Schwartz ............. G06F 18/22
382/180
2017/0255891 A1* 9/2017 Morate ................ G06V 20/52
(Continued)

FOREIGN PATENT DOCUMENTS

JP    2015-210651 A        11/2015
JP    2016071782 A  *       5/2016
(Continued)

OTHER PUBLICATIONS

International Search Report for PCT Application No. PCT/JP2020/019258, mailed on Jun. 30, 2020.

*Primary Examiner* — Sumati Lefkowitz
*Assistant Examiner* — Ryan P Potts
(74) *Attorney, Agent, or Firm* — Sughrue Mion, PLLC (57) ABSTRACT

A product identification apparatus includes an acquisition unit, an image processing unit, and a storage processing unit. The acquisition unit acquires an image generated by an image capturing apparatus 10. The image includes a product shelf and a product. The image processing unit determines a position where continuity of the product shelf is broken by processing the image acquired by the acquisition unit, and divides the product shelf into a unit region by using the position. Further, the image processing unit determines a kind and a product name of the product by processing the image acquired by the acquisition unit. The storage processing unit causes a storage unit to store product identification information of the product located in the unit region, for each unit region of the product shelf.

6 Claims, 8 Drawing Sheets

(51) Int. Cl.
*G06Q 30/0601* (2023.01)
*G06T 3/4038* (2024.01)
*G06T 7/11* (2017.01)
*G06V 10/22* (2022.01)
*G06V 10/764* (2022.01)

(52) U.S. Cl.
CPC .............. *G06T 3/4038* (2013.01); *G06T 7/11* (2017.01); *G06V 10/22* (2022.01); *G06V 10/764* (2022.01); *G06T 2207/20212* (2013.01); *G06T 2207/30242* (2013.01)

(58) Field of Classification Search
CPC ...... G06V 10/764; G06V 10/22; G06V 20/52; G06Q 30/0639; G06Q 10/087; G06Q 20/203; G06F 16/54; G06K 7/1413; G06K 9/32; G06K 9/2081; G06K 9/22; G06N 20/00
See application file for complete search history.

(56) References Cited

U.S. PATENT DOCUMENTS

| | | | |
|---|---|---|---|
| 2020/0068126 A1* | 2/2020 | Fink | G06K 7/1413 |
| 2020/0219043 A1* | 7/2020 | Talbot | G06F 16/5854 |
| 2020/0380694 A1* | 12/2020 | Chan | G06T 7/11 |
| 2020/0394599 A1 | 12/2020 | Akatsuka | |
| 2021/0158278 A1* | 5/2021 | Bogolea | G06Q 10/087 |
| 2022/0138674 A1* | 5/2022 | Skaff | G06V 10/16 705/28 |

FOREIGN PATENT DOCUMENTS

| | | |
|---|---|---|
| JP | 2016-224831 A | 12/2016 |
| JP | 2018-139062 A | 9/2018 |
| WO | 2019/107157 A1 | 6/2019 |

* cited by examiner

| UNIT REGION A$_1$ | | | | |
|---|---|---|---|---|
| NUMBER OF ROWS | 5 | | | |
| SHELF 1 | GREEN TEA 1 | GREEN TEA 1 | BARLEY TEA 1 | ... |
| SHELF 2 | CARBONATED BEVERAGE 1 | CARBONATED BEVERAGE 1 | CARBONATED BEVERAGE 1 | ... |
| ⋮ | ⋮ | ⋮ | ⋮ | ⋮ |

VERTICAL DIRECTION

HORIZONTAL DIRECTION

PRODUCT IDENTIFICATION APPARATUS, PRODUCT IDENTIFICATION METHOD, AND NON-TRANSITORY COMPUTER-READABLE MEDIUM

This application is a National Stage Entry of PCT/JP2020/019258 filed on May 14, 2020, the contents of all of which are incorporated herein by reference, in their entirety.

TECHNICAL FIELD

The present invention relates to a product identification apparatus, a product identification method, and a program.

BACKGROUND ART

In a store where a product is sold, a position of a product on a product shelf, specifically, a shelf layout is important, since the shelf layout affects sales in the store. For example, Patent Documents 1 and 2 describe that, by processing a captured image of a product shelf, a product region image included in the image is determined, and a product is determined for each product region image. Further, Patent Document 2 also describes that skew correction or distortion correction is performed with respect to an image.

RELATED DOCUMENT

Patent Document

Patent Document 1: International Publication No. WO2019/107157
Patent Document 2: Japanese Patent Application Publication No. 2015-210651

SUMMARY OF THE INVENTION

Technical Problem

It is often a case that a plurality of product shelves are arranged in one store. Therefore, in order to efficiently manage a state of a shelf layout, it is desirable to divide a product shelf into a plurality of regions at a significant position, and determine a kind of a product for each region. One example of an object of the present invention is to divide a product shelf into a plurality of regions at a significant position, and determine a kind of a product for each region.

Solution to Problem

The present invention provides a product identification apparatus including:
  an acquisition unit that acquires an image of a shelf on which a product is placed;
  an image processing unit that determines a position where continuity of the shelf is broken by processing the image, divides the shelf into a unit region by using the position, and also determines the product; and
  a storage processing unit that causes a storage unit to store product identification information of the product located in the unit region, for each of the unit regions.
The present invention provides a product identification method including,
  by a computer:
  acquiring an image of a shelf on which a product is placed;
  determining a position where continuity of the shelf is broken by processing the image, dividing the shelf into at least one unit region by using the position, and also determining the product; and
  causing a storage unit to store product identification information of the product located in the unit region, for each of the unit regions.
The present invention provides a program causing a computer to include:
  an acquisition function of acquiring an image of a shelf on which a product is placed;
  an image processing function of determining a position where continuity of the shelf is broken by processing the image, dividing the shelf into at least one unit region by using the position, and also determining the product; and
  a storage processing function of causing a storage unit to store product identification information of the product located in the unit region, for each of the unit regions.

Advantageous Effects of Invention

The present invention enables to divide a product shelf into a plurality of regions at a significant position, and determine a kind of a product for each region.

BRIEF DESCRIPTION OF THE DRAWINGS

The above-described object, the other objects, features, and advantages will become more apparent from suitable example embodiments described below and the following accompanying drawings.

DESCRIPTION OF EMBODIMENTS

Hereinafter, example embodiments according to the present invention are described with reference to the drawings. Note that, in all the drawings, a similar constituent element is indicated by a similar reference sign, and description thereof will not be repeated as appropriate.

First Example Embodiment

Figure 1:
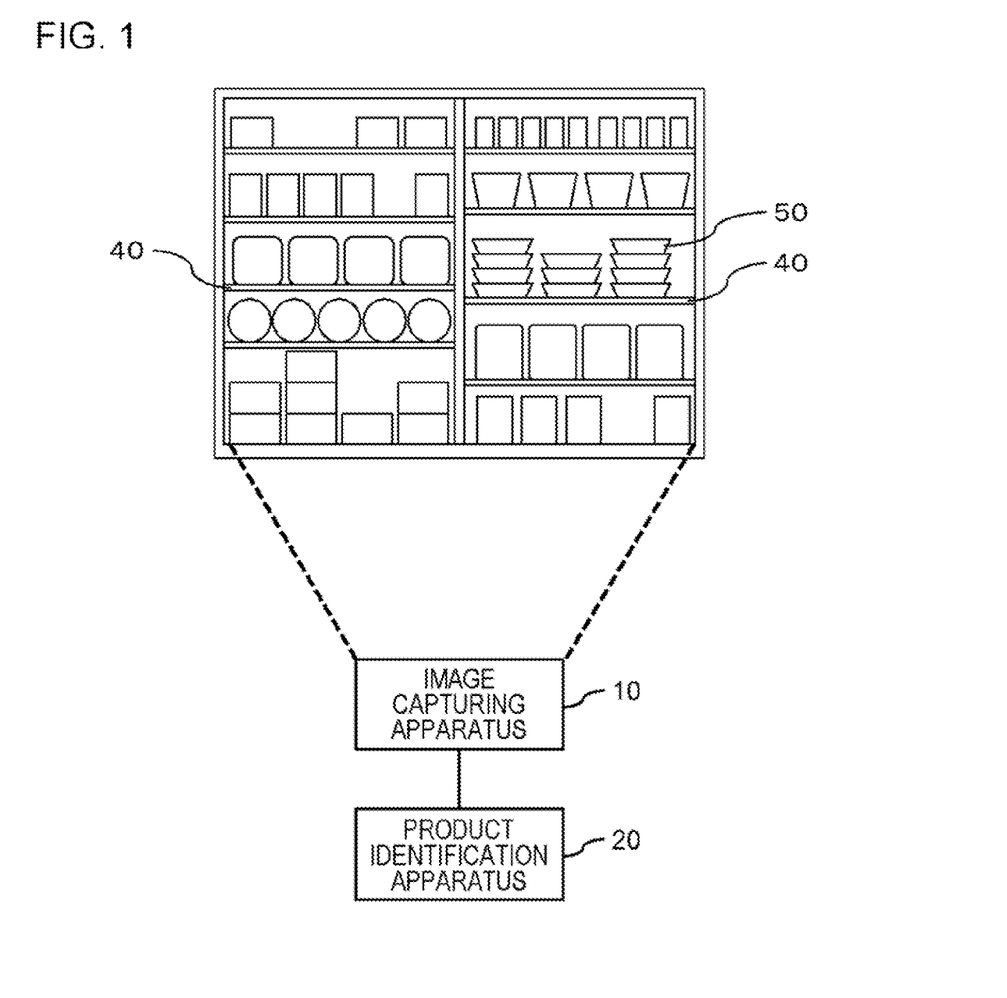
FIG. 1 is a diagram illustrating a usage environment of a product identification apparatus according to a first example embodiment.

FIG. 1 is a diagram illustrating a usage environment of a product identification apparatus 20 according to a present example embodiment. The product identification apparatus 20 is used together with an image capturing apparatus 10. The image capturing apparatus 10 captures an image of a product shelf 40. An image generated by the image capturing apparatus 10 is transmitted to the product identification apparatus 20. The product identification apparatus 20 determines a position of a product 50 on the product shelf 40 by processing the image generated by the image capturing apparatus 10. A person using the product identification apparatus 20 confirms whether the position of the product 50 is a desired position by using a processing result of the product identification apparatus 20.

The image capturing apparatus 10 is a portable apparatus. The image capturing apparatus 10 may be a communication apparatus with an image capturing function, such as a so-called smartphone. A user of the image capturing apparatus 10 divides the product shelf 40 into a plurality of regions, generates an image for each region, and transmits the image to an external apparatus, for example, the product identification apparatus 20. Further, the product identification apparatus 20 performs processing of determining a position of the product 50 with respect to each of a plurality of images.

Generally, it is often a case that a plurality of product shelves 40 are provided one over another in a vertical direction. Further, it is often a case that a vertical interval between the product shelves 40 is set according to a kind of the product 50 to be placed on the product shelf 40. Therefore, it is often a case that a height of the product shelf 40 becomes discontinuous at a position where a kind of the product 50 is changed. The product identification apparatus 20 determines a position where continuity of the product shelf 40 is broken by processing an image generated by the image capturing apparatus 10, and divides the product shelf 40 into a unit region by using the position. Further, the image capturing apparatus 10 determines the product 50 by processing the image, and causes a storage unit (e.g., a storage unit 240 to be described later) to store product identification information of the product 50 located in the unit region, for example, a JAN code, for each unit region.

Figure 2:
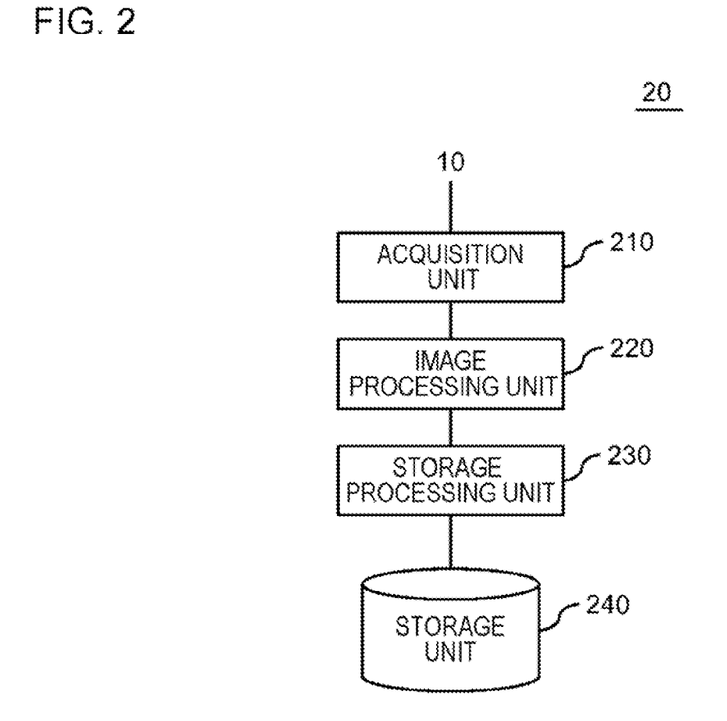
FIG. 2 is diagram illustrating one example of a functional configuration of the product identification apparatus.

FIG. 2 is a diagram illustrating one example of a functional configuration of the product identification apparatus 20. In the example illustrated in FIG. 2, the product identification apparatus 20 includes an acquisition unit 210, an image processing unit 220, and a storage processing unit 230. The acquisition unit 210 acquires an image generated by the image capturing apparatus 10. The image includes the product shelf 40 and the product 50. The image processing unit 220 determines, by processing an image acquired by the acquisition unit 210, a position where continuity of the product shelf 40 is broken, and divides the product shelf 40 into a unit region by using the position. Further, the image processing unit 220 determines a kind and a product name of the product 50 by processing the image acquired by the acquisition unit 210. For example, the image processing unit 220 determines a kind, a product name, and product identification information of the product 50 by using a storage unit that stores product identification information and a feature value of the product 50, for each kind of the product 50. The storage processing unit 230 causes the storage unit 240 to store product identification information of the product 50 located in the unit region, for each unit region of the product shelf 40.

In the example illustrated in FIG. 2, the storage unit 240 becomes a part of the product identification apparatus 20. However, the storage unit 240 may be an external apparatus of the product identification apparatus 20.

Further, the image processing unit 220 may perform distortion correction processing. A distortion to be corrected herein is, for example, a distortion due to an optical system (e.g., a lens) or the like of the image capturing apparatus 10.

Further, in a case where an image includes a product shelf 40 having a curved edge surface, the image processing unit 220 may perform distortion correction in such a way that the product shelf 40 has a straight edge surface. In this case, the position of the product 50 is also corrected according to a correction amount of the edge surface of the product shelf 40.

Figure 3:
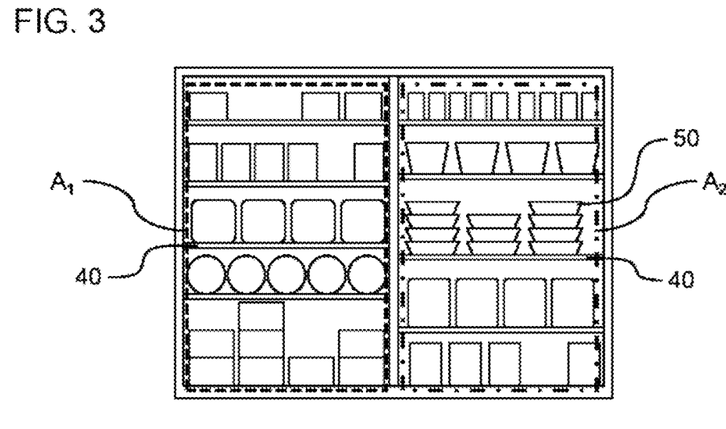
FIG. 3 is a diagram illustrating a first example of a method of dividing a product shelf into a unit region.

FIG. 3 illustrates a first example of a method of dividing a product shelf 40 into a unit region. In the example illustrated in FIG. 3, a plurality of product shelves 40 are provided one over another in a vertical direction, and each of which extends in a same direction (a left-right direction in FIG. 3). First, the image processing unit 220 detects each of the plurality of product shelves 40 by using edge detection processing, feature value matching, or the like, and determines an extending direction of each of these plurality of product shelves 40. Further, the image processing unit 220 determines a position where a product shelf 40 becomes discontinuous in an extending direction of the product shelf 40, for each of the plurality of product shelves 40. For example, the image processing unit 220 generates a line (e.g., a straight line) in such a way that the line overlaps an edge surface of the product shelf 40, and determines a position where the line becomes discontinuous. Further, the image processing unit 220 divides the product shelf 40 at the position, and sets unit regions $A_1$ and $A_2$. In the example illustrated in FIG. 3, the product shelf 40 is displaced in a vertical direction. The image processing unit 220 determines a position where the displacement occurs, and sets a boundary of a unit region at the position.

Note that, as illustrated in FIG. 3, in a case where a plurality of product shelves 40 are provided one over another in the vertical direction, it is preferable that the image processing unit 220 sets a boundary of a unit region at a position becoming discontinuous in at least one product shelf 40. However, the image processing unit 220 may set a boundary of a unit region at a position where a prescribed number or more of product shelves 40 becomes discontinuous. Herein, the prescribed number is two or more.

Figure 4:
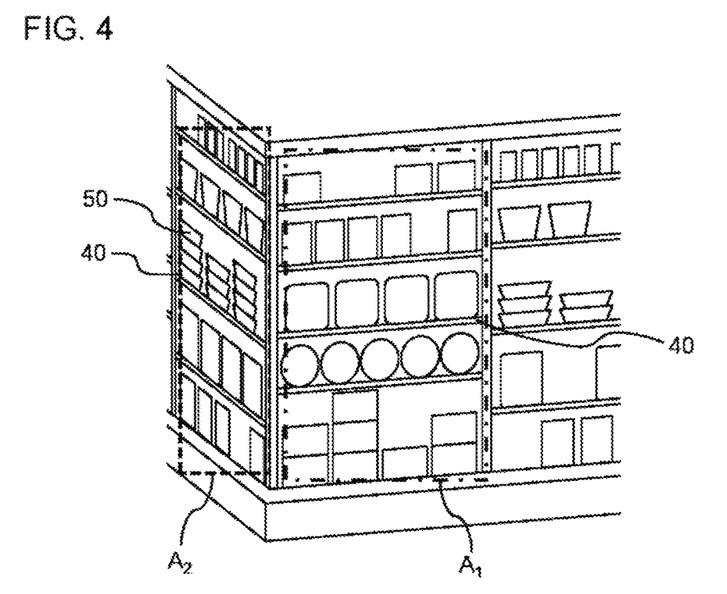
FIG. 4 is a diagram illustrating a second example of the method of dividing a product shelf into a unit region.

FIG. 4 illustrates a second example of the method of dividing a product shelf 40 into a unit region. In the example illustrated in FIG. 4, a plurality of product shelves 40 has a corner portion. The image processing unit 220 determines the corner portion, as a position where the product shelf 40 becomes discontinuous, divides the product shelf 40 at the position, and sets unit regions $A_1$ and $A_2$.

Figure 5:
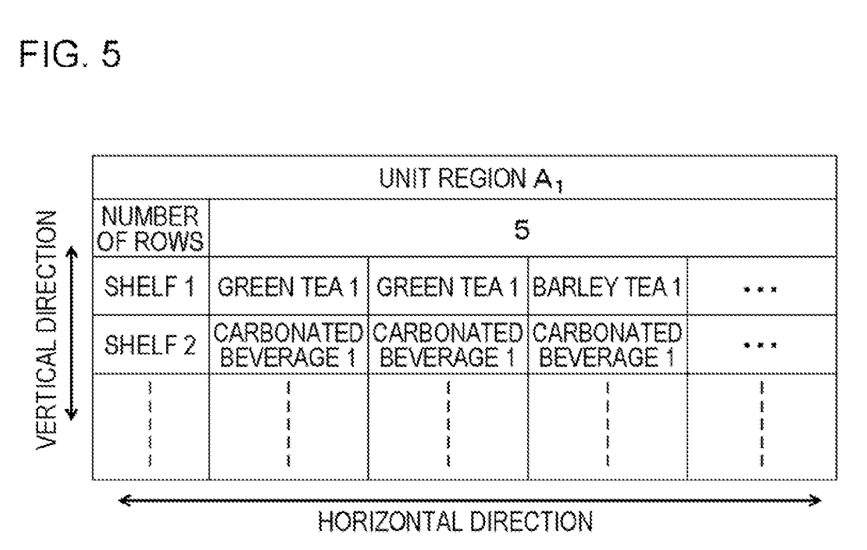
FIG. 5 is a diagram illustrating one example of information stored in a storage unit.

FIG. 5 is a diagram illustrating one example of information stored in the storage unit 240. In the example illustrated in FIG. 5, the storage unit 240 stores product identification information of a product 50 placed in a unit region, for each unit region of a product shelf 40. In the example illustrated in FIG. 5, product identification information is stored in a table format. An order of arrangement of pieces of product identification information in the table is associated with an order of arrangement of actual products 50. This enables to confirm the order of arrangement of products 50 on the product shelf 40 by confirming the order of arrangement of pieces of product identification information in the storage unit 240.

Further, in the example illustrated in FIG. 5, the storage unit 240 further stores the number (the number of rows) of product shelves 40 in a unit region, for each unit region. The number of product shelves 40 is determined by the image processing unit 220. Thus, a person who looks at information stored in the storage unit 240 can easily estimate a position of the unit region in a store.

Figure 6:
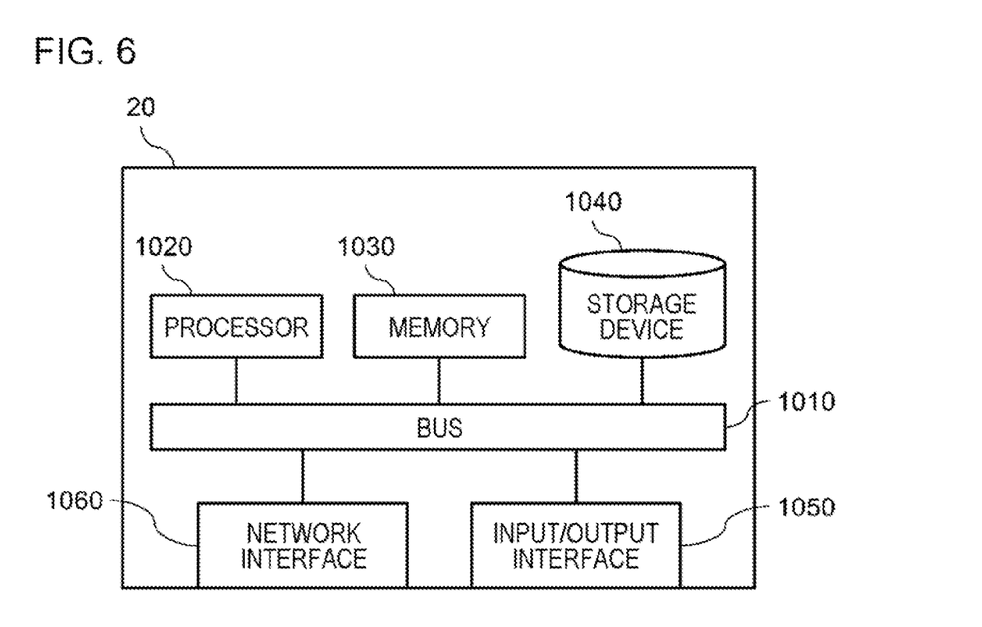
FIG. 6 is a diagram illustrating a hardware configuration example of the product identification apparatus.

FIG. 6 is a diagram illustrating a hardware configuration example of the product identification apparatus 20. The product identification apparatus 20 includes a bus 1010, a processor 1020, a memory 1030, a storage device 1040, an input/output interface 1050, and a network interface 1060.

The bus 1010 is a data transmission path along which the processor 1020, the memory 1030, the storage device 1040, the input/output interface 1050, and the network interface 1060 mutually transmit and receive data. However, a method of mutually connecting to the processor 1020 and the like is not limited to bus connection.

The processor 1020 is a processor to be achieved by a central processing unit (CPU), a graphics processing unit (GPU), or the like.

The memory 1030 is a main storage apparatus to be achieved by a random access memory (RAM) or the like.

The storage device 1040 is an auxiliary storage apparatus to be achieved by a hard disk drive (HDD), a solid state drive (SSD), a memory card, a read only memory (ROM), or the like. The storage device 1040 stores a program module achieving each function (e.g., the acquisition unit 210, the image processing unit 220, and the storage processing unit 230) of the product identification apparatus 20. The processor 1020 achieves each function associated with the program module by reading each program module in the memory 1030 and executing each program module. Further, the storage device 1040 also functions as the storage unit 240.

The input/output interface 1050 is an interface for connecting the product identification apparatus 20 and various pieces of input/output equipment with each other.

The network interface 1060 is an interface for connecting the product identification apparatus 20 to a network. The network is, for example, a local area network (LAN) or a wide area network (WAN). A method of connecting the network interface 1060 to a network may be wireless connection, or may be wired connection. The product identification apparatus 20 may communicate with the image capturing apparatus 10 via the network interface 1060.

Figure 7:
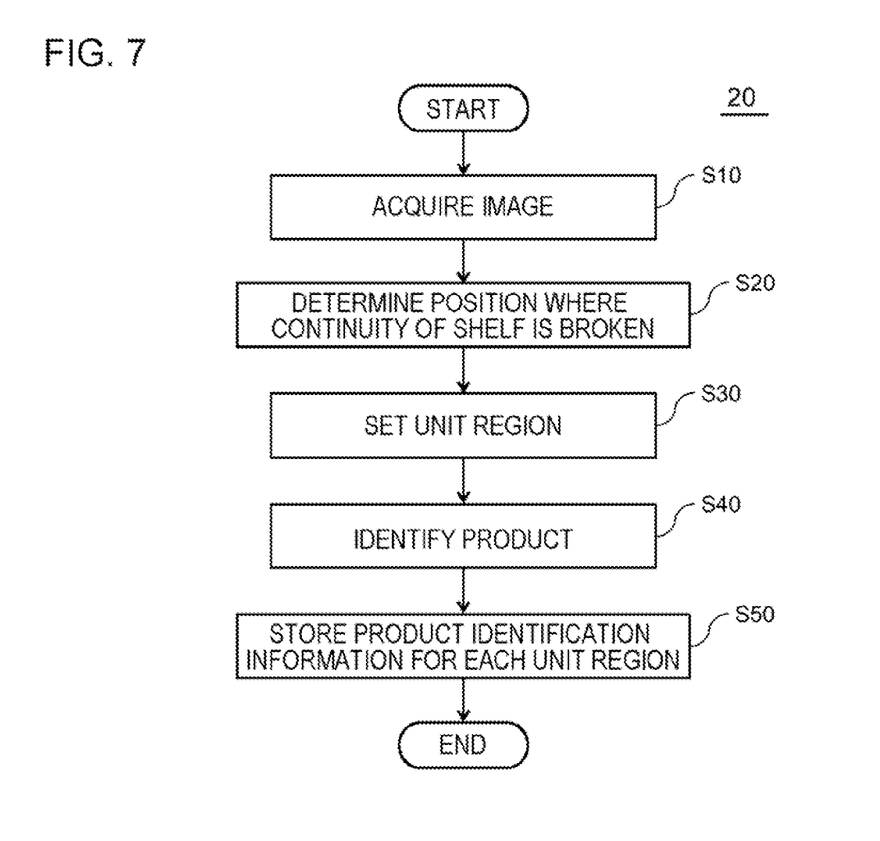
FIG. 7 is a flowchart illustrating processing to be performed by the product identification apparatus.

FIG. 7 is a flowchart illustrating processing to be performed by the product identification apparatus 20. The acquisition unit 210 of the product identification apparatus 20 acquires an image generated by the image capturing apparatus 10 (step S10). For example, in a case where the product identification apparatus 20 includes a storage unit for storing an image generated by the image capturing apparatus 10, the acquisition unit 210 acquires an image from the storage unit. Further, the acquisition unit 210 may directly acquire an image from the image capturing apparatus 10.

Subsequently, the image processing unit 220 of the product identification apparatus 20 determines a position where continuity of the product shelf 40 is broken by processing the image acquired in step S10 (step S20), and sets a boundary of a unit region at the position (step S30).

Further, the image processing unit 220 identifies a kind and a position of the product 50 by processing the image acquired in step S10 (step S40). Then, the storage processing unit 230 stores product identification information of the product 50 identified by the image processing unit 220, for each unit region set by the image processing unit 220 (step S50).

Note that, the image processing unit 220 may perform step S40 prior to step S20 and step S30, or may perform step S40 concurrently with step S20 and step S30.

As described above, according to the present example embodiment, the product identification apparatus 20 determines a position where continuity of the product shelf 40 is broken, and sets a unit region by using the position. Generally, it is often a case that a height of a product shelf 40 becomes discontinuous at a position where a kind of the product 50 is changed. Therefore, setting a unit region, and storing product identification information of the product 50 for each unit region, as the product identification apparatus 20, enables to efficiently manage a state of a shelf layout.

Second Example Embodiment

Figure 8:
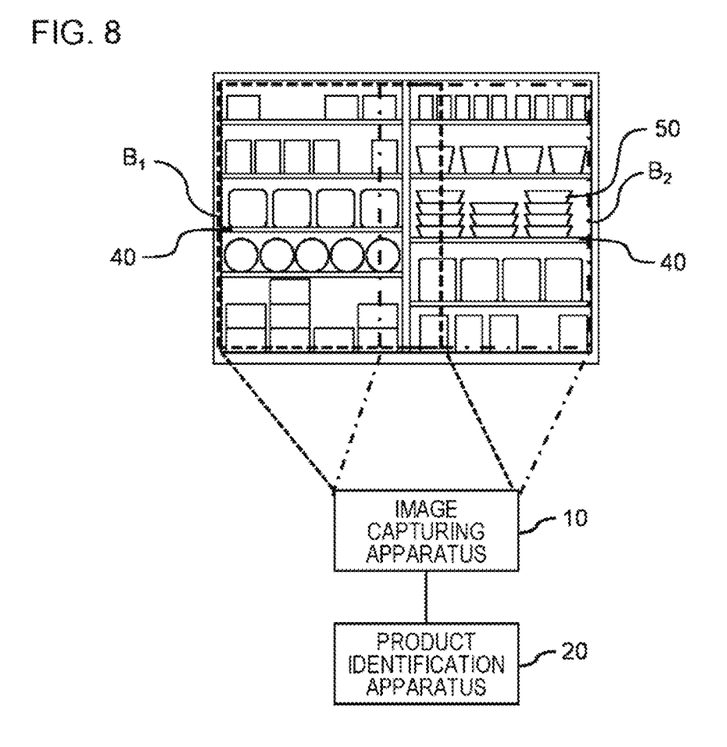
FIG. 8 is a diagram illustrating a function of a product identification apparatus according to a second example embodiment.

FIG. 8 is a diagram illustrating a function of a product identification apparatus 20 according to a present example embodiment. In the present example embodiment, a user of an image capturing apparatus 10 divides a product shelf 40 into a plurality of regions (e.g., a first shelf region $B_1$ and a second shelf region $B_2$) in a horizontal direction, specifically, an extending direction of the product shelf 40, and generates an image for each region. At this occasion, when generating a second image acquired by capturing the second shelf region $B_2$, after generating a first image acquired by capturing the first shelf region $B_1$, it is in such a way that an end portion of the first image, and an end portion of the second image overlap each other (specifically, become an image in a same region).

Further, an image processing unit 220 of the product identification apparatus 20 generates a stitched image in which a plurality of images (e.g., a first image and a second image) generated by the image capturing apparatus 10 are stitched in a horizontal direction, and sets the sequential image as a processing target described in the first example embodiment.

According to the present example embodiment, even when the product shelf 40 is long in a horizontal direction, it is possible to set a unit region in the product shelf 40, and store product identification information of a product 50 for each unit region.

As described above, while the example embodiments according to the present invention have been described with reference to the drawings, these example embodiments are an example of the present invention, and various configurations other than the above can also be adopted.

Further, in a plurality of flowcharts used in the above description, a plurality of processes (pieces of processing) are described in order, but an order of execution of processes to be executed in each example embodiment is not limited to the order of description. In each example embodiment, the illustrated order of processes can be changed within a range that does not adversely affect a content. Further, the above-described example embodiments can be combined, as far as contents do not conflict with each other.

REFERENCE SIGNS LIST

10 Image capturing apparatus
20 Product identification apparatus
40 Product shelf
50 Product
210 Acquisition unit
220 Image processing unit
230 Storage processing unit
240 Storage unit

What is claimed is:
1. A product identification apparatus comprising:
at least one memory configured to store instructions; and
at least one processor configured to execute the instructions to perform operations comprising:

acquiring an image of shelves on each of which at least one product is placed;

detecting an extending direction of each of the shelves by processing the image;

detecting displacement in a vertical direction between two adjacent shelves based on the extending directions detected for each of the two adjacent shelves;

determining a position where the displacement occurs as a position where continuity of the two adjacent shelves is broken;

setting, in the image, a boundary of two adjacent unit regions based on the position where the continuity of the two adjacent shelves is broken;

identifying the at least one product placed on each of the two adjacent shelves by processing the two adjacent unit regions defined by the boundary set in the image; and causing a storage to store product identification information of the at least one product identified for each of the two adjacent shelves.

2. The product identification apparatus according to claim 1, wherein the image includes at least first and second shelves with different heights, and the operations comprise:

determining, at least, a first position where continuity of the first shelf and a third shelf adjacent to the first shelf is broken and a second position where continuity of the second shelf and a fourth shelf adjacent to the second shelf is broken; and setting the boundary of the two adjacent unit regions based on at least the first position and the second position.

3. The product identification apparatus according to claim 2, wherein the first and second shelves and the third and fourth shelves are separately captured into a plurality of images aligned in a horizontal direction, and the operations comprise generating a stitched image in which the plurality of images are stitched, and setting the boundary of the two adjacent unit regions by using the stitched image.

4. The product identification apparatus according to claim 2, wherein the operations comprise:

determining a number of shelves in each of the two adjacent unit regions, and causing the storage to store the number of shelves in the unit region, for each of the two adjacent unit regions.

5. A product identification method comprising, by a computer:

acquiring an image of shelves on each of which at least one product is placed;

detecting an extending direction of each of the shelves by processing the image;

detecting displacement in a vertical direction between two adjacent shelves based on the extending directions detected for each of the two adjacent shelves;

determining a position where the displacement occurs as a position where continuity of the two adjacent shelves is broken;

setting, in the image, a boundary of two adjacent unit regions based on the position where the continuity of the two adjacent shelves is broken;

identifying the at least one product placed on each of the two adjacent shelves by processing the two adjacent unit regions defined by the boundary set in the image; and causing a storage to store product identification information of the at least one product identified for each of the two adjacent shelves.

6. A non-transitory computer-readable medium storing a program causing a computer to perform operations comprising:

acquiring an image of shelves on each of which at least one product is placed;

detecting an extending direction of each of the shelves by processing the image;

detecting displacement in a vertical direction between two adjacent shelves based on the extending directions detected for each of the two adjacent shelves;

determining a position where the displacement occurs as a position where continuity of the two adjacent shelves is broken;

setting, in the image, a boundary of two adjacent unit regions based on the position where the continuity of the two adjacent shelves is broken;

identifying the at least one product placed on each of the two adjacent shelves by processing the two adjacent unit regions defined by the boundary set in the image; and causing a storage to store product identification information of the at least one product identified for each of the two adjacent shelves.

* * * * *